DOCUMENT SENSING METHOD AND SYSTEM UTILIZING INFRA-RED STIMULATED PHOSPHORS
Filed Feb. 5, 1957
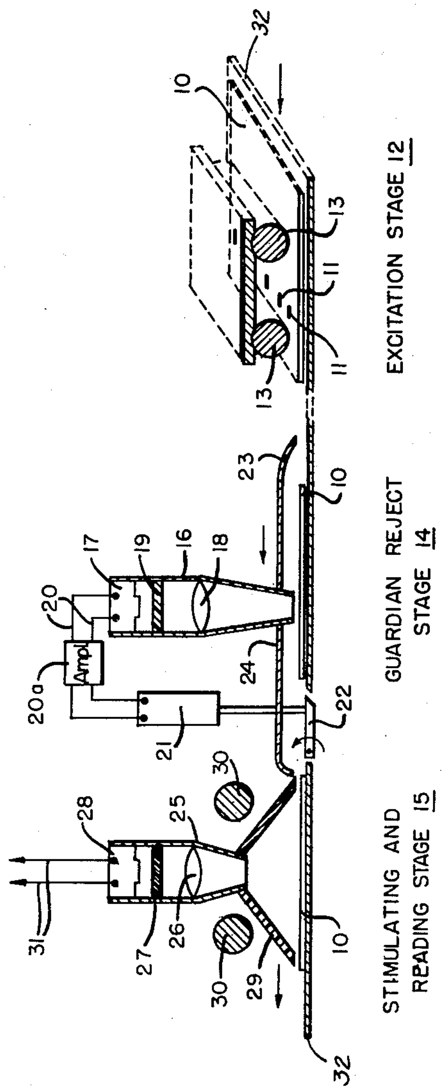
INVENTORS
G. R. Adams
T. R. Cleary
BY
Charles C. Englisk
AGENT 3,012,667

DOCUMENT SENSING METHOD AND SYSTEM UTILIZING INFRA-RED STIMULATED PHOSPHORS

George Richard Adams, Elkins Park, and Thomas R. Cleary, Drexel Hill, Pa., assignors to Sperry Rand Corporation, New York, N.Y., a corporation of Delaware Filed Feb. 5, 1957, Ser. No. 638,403
7 Claims. (Cl. 209—111.5)

The present invention relates to an improved method and apparatus for mark sensing, such as may be employed, for example, in the reading of documents; and is more particularly concerned with a system of document or phosphor mark sensing which assures more certain mark sensing than has been possible heretofore.

As is well known at the present time, various records and/or documents can have information placed thereon for purposes of storing such information or for sorting records; and this information may in turn take various forms. One such form, suggested in the past, comprises the placing of fluorescent or phosphorescent marks on the said records or documents, which marks are disposed, for example, in accordance with a preselected code; and documents so marked are ordinarily sensed by exposing the said documents and the marks thereon to a source of ultra-violet radiation whereby the said marks emit light which may be detected by an appropriate photosensitive structure.

It has been found that record sorting and identifying systems utilizing conventional phosphors of the types employed heretofore, and employing sensing techniques of the types described above, may give spurious or incorrect indications of the information stored on the record. These incorrect indications arise by reason of extraneous or false marks of a phosphorescent or fluorescent nature which may consist of foreign material inadvertently introduced onto or into the document. When this latter circumstance is present, attempts to excite information marks comprising a conventional phosphor, through use of ultra-violet radiation, also cause the said false marks to emit radiation, whereby the signals ultimately detected at the aforementioned photosensitive structures are not truly indicative of the information stored on the card.

The present invention serves to obviate such false sensing of documents by forming code markings, on or in the said document, of a material comprising an infra-red stimulable phosphor. Such phosphors are, per se, well known, and certain examples thereof will be given subsequently. However, the essence of the present invention resides in the use of such phosphors in the storage of information, as well as in the provision of novel sensing methods, apparatuses, and document structures utilizing, in combination, such infra-red stimulable phosphors.

By utilizing marks containing an infra-red stimulable phosphor, a document may be read-out by initially exciting the marks with visible or near ultra-violet light, thereby to store energy in the said marks. The card may then be moved by suitable means from this exciting station to a stimulating station, at which latter station infra-red stimulating radiation is impressed upon the document whereby the phosphor marks rapidly emit their stored energy as visible light which may be detected by appropriate detector structures. When this arrangement is employed, therefore, any extraneous emission occurring from false phosphorescent or fluorescent marks will cease before the infra-red stimulation station is reached; and inasmuch as such false markings are not stimulated by infra-red, the ultimate information read, upon stimulation of the document, corresponds to the information actually stored on the said document.

Moreover, by using infra-red stimulable phosphors for record sorting and identifying purposes, any light emitted by false phosphorescent marks subsequent to excitation of the document and prior to stimulation thereof, can be utilized to perform a control function whereby any document bearing false marks can be rejected from the system prior to actual reading thereof. By reason of these concepts and structures, therefore, an improved method and apparatus for record sorting, sensing and identifying is provided which overcomes many of the disadvantages inherent in phosphorescent or fluorescent mark systems suggested heretofore.

It is accordingly an object of the present invention to provide an improved mark sensing arrangement.

Another object of the present invention resides in the provision of an improved method and apparatus for mark sensing utilizing infra-red stimulated phosphors.

Still another object of the present invention resides in the provision of a document sensing system which is inherently safe from incorrectly sensed information due to the presence of false marks or extraneous luminescent materials which may be present on or in the document being sensed.

Another object of the present invention resides in the provision of an improved document sensing system which is capable of detecting the presence of false or extraneous information carried on or in the said document, whereby the said document may be rejected prior to reading thereof.

A further object of the present invention resides in the provision of an improved information coding and storage system which is more certain and accurate in its operation than systems suggested heretofore.

The foregoing objects, and advantages, construction and operation of the present invention will become more readily apparent from the following description and the accompanying drawing.

In particular, referring to the drawing, it will be seen that in accordance with the present invention, an improved method and apparatus for record sorting, sensing or identifying may utilize a document 10, for example similar to a punch card, having one or more groups of marks 11 thereon. The card 10 preferably has a predetermined plurality of discrete spaced locations, each of which is adapted to receive a phosphor mark 11, whereby the particular number and disposition of the several marks 11 in these several spaced locations can indicate some particular information which is to be recorded on a given document 10. The several marks 11 comprise, in accordance with the present invention, an infra-red stimulable phosphor. As a matter of practice, there are relatively few such infra-red stimulable phosphors, and insofar as presently known, no such phosphors occur in a natural state. For these reasons, therefore, the use of an infra-red stimulable phosphor in the provision of the several marks 11 tends to assure that the information subsequently read from document 10 by the exciting and stimulating steps, to be described, corresponds only to the marks 11, and will not in all probability include false information resulting from false marks of substantially conventional luminescent materials which may be present on the document. Typical infra-red stimulable phosphors which may be utilized in providing marks 11 are as follows:

Cubical—ZnS:Mn
Hexagonal—ZnS:Cu:Pb
Cubical—$SrS:SrSO_4:CaF_2:Sm:Eu$
Cubical—$SrS:SrSO_4:LiF:Sm:Ce$ A document 10 having marks 11 comprising an infra-red stimulable phosphor of one or more of the types mentioned, may be sensed in accordance with the present invention by causing the said document to be moved successively from an exciting stage 12 to a stimulating and reading stage 15. Moreover, as will appear subsequently, a guardian stage may be disposed intermediate the excitation and stimulating stages, thereby to positively detect false radiation from the document, whereby the said document can be rejected prior to the reading thereof.

In particular, and referring once more to the accompanying drawing, it will be seen that document 10 (which may, for instance, comprise one of a plurality of documents being sensed in sequence), can be passed first through an excitation stage 12 comprising one or more lamps 13 which emit visible or near ultra-violet light. The particular wavelength of energy emitted by lamps 13 will depend upon the particular phosphors employed in the marks. As a matter of practice, the lamps 13 are so chosen that they effect a maximum excitation in the phosphor marks 11. As the document 10 passes under lamps 13, energy is stored in the several phosphor marks 11; and this energy, by the nature of the material comprising marks 11, may subsequently be emitted by irradiating the said marks with infra-red.

In the course of excitation at stage 12, certain false marks may be caused to emit energy. As a matter of practice, this false or extraneous radiation of energy tends to cease before the document reaches the stimulating and reading stage 15, to be described. However, if desired, a guardian stage may be interposed between stages 12 and 15 to reject a document carrying false phosphorescent marks thereon, or to perform some other control or indicating function which denotes the presence of such false marks on a given document.

In particular, a suitable moving means, represented by a conveyor belt 32 may carry the said document 10 which may, therefore, be caused to pass through a guardian reject stage 14 comprising a photosensitive detector 16 having a photo-pickup device 17 therein, such as a phototransistor, photodiode, or phototube. In the event that the excitation stage 12 causes extraneous radiations to be emitted from false phosphorescent marks on the document 10, the energy so emitted will be concentrated by a lens 18 and will thence pass via a bandpass optical filter 19 (adapted to pass light only of the wavelength emitted by legitimate marks 11 which are to be sensed in the reading stage 15), to the photosensitive device 17. An output is, therefore, provided from the guardian stage on lines 20 (provided that the phosphorescence sensed is greater than that which may be legitimately emitted from a true mark). This output may be utilized to perform any desired control function, or to actuate an appropriate indicator. In the particular preferred embodiment of the present invention illustrated in the drawing, any output appearing on lines 20 may be coupled, for instance via appropriate amplifier means 20*a*, to a solenoid 21 thereby to actuate a reject mechanism symbolically illustrated at 22, whereby a document containing such false marks will be rejected prior to reading thereof. It should be noted that the light emitted by infra-red phosphors, when excited at stage 12 in the manner described, is generally less than the phosphorescence of non-infra-red phosphors so excited. Accordingly, if the solenoid 21 is driven by an amplifier system 20*a* having a finite threshold which is not exceeded by the phosphorescence output of the infra-red phosphor, the desired discrimination between true and false emissions can be positively maintained.

In order to assure that the radiation emitted by marks on document 10, as it passes through the guardian stage 14, arises solely by reason of previous excitation from lamps 13 in the excitation stage 12, an ultra-violet blocking shield 23 may be disposed between the guardian stage 14 and excitation stage 12; and a further infra-red blocking shield 24 may be disposed between the said guardian stage 14 and the stimulating stage 15, to be described. The guardian stage 14 comprises a preferred embodiment of the present invention; but it will be appreciated that it is in fact optional in nature inasmuch as the excitation stage 12 and stimulating stage 15 may be sufficiently spaced from one another so that any false or extraneous fluorescent radiation will cease prior to passage of the document 10 into the said stimulating and reading stage. Undesired or false phosphorescent radiations may not cease during such passage, however, and the guardian stage 14 therefore positively protects the system accuracy from these latter false emissions.

Assuming that no false marks or extraneous phosphorescent radiation causes a reject of the document 10, the said document 10 is then moved by belt 32 from the guardian stage 14 to a stimulating and reading stage 15 which comprises a further photosensitive device 25 having therein a lens 26, a band-pass optical filter 27 adapted to pass light only of the wavelength emitted by phosphor marks 11 upon stimulation, and a photo-pickup device 28 similar to device 17. An infra-red filter 29 is disposed from the lowermost end of detector 25 to a position closely adjacent to but spaced from the normal position of document 10 as it passes through the stimulating and reading stage 15. The filter 29 is adapted to transmit infra-red but not visible radiation. One or more infra-red lamps 30 are disposed, as shown, adjacent filter 29 whereby infra-red is caused to pass through the said filter 29 onto document 10 as it moves into the stimulating and reading stage 15. This irradiation of document 10 by infra-red causes the energy previously stored in marks 11 to be rapidly emitted as visible light, and this light emission is detected by photo-pickup device 28, thereby to give an appropriate output on output lines 31. As a result of this structure, therefore, marks 11 may be read substantially simultaneous with stimulation thereof.

It will be appreciated that the pickup devices 25 and 16, illustrated in the accompanying drawing, in fact comprise a plurality of pickup devices mounted side-by-side adjacent the guardian stage 14 and adjacent the stimulating and reading stage 15 respectively; and ordinarily there will be one such pickup device for each possible column or channel of coded information. Accordingly, the signals appearing on the output lines, such as 31, will be coded in accordance with the code disposition of marks 11 on a given document 10, whereby a direct indication of the stored information is provided for record identifying or sorting purposes. The document itself, or a plurality of documents similar to 10, can be moved consecutively through the excitation, guardian, stimulating and reading stages, by any appropriate moving means 32, for example a conveyor belt or a series of rollers (not shown), of which many such drive structures are known in the art.

The use of infra-red stimulated phosphors in record identifying and sorting systems of the types described above results in substantially improved operation of the overall system, and obviates the possibility of false outputs. While we have described a preferred embodiment of the present invention, many variations will be suggested to those skilled in the art, and it must, therefore, be emphasized that the foregoing description is meant to be illustrative only and should not be considered limitative of the present invention. All such variations and modifications as are in accord with the principles described are meant to fall within the scope of the appended claims.

Having thus described our invention, we claim:

1. In combination, a document having an infra-red stimulable phosphor thereon, means including an ultra-violet radiation source for irradiating said document thereby to excite said phosphor, a first detector means, means for moving said document from said irradiating means to said first detector means, said first detector means including means for performing a control function in response to energy above a threshold level emitted by said excited phosphor on said document subsequent to said irradiation thereof, a second detector means, an infra-red radiation source adjacent said second detector means and means for moving said document from said first detector means to said infra-red source and second detector means thereby to effect an output signal from said second detector means in response to stimulation of said phosphor by infra-red from said source.

2. The combination of claim 1 wherein said phosphor comprises a coded disposition of infra-red stimulable phosphor marks such that normally energy below said threshold level is emitted by said excited phosphors on said document, whereby operation of said first detector means is indicative of extraneous emissions from suprious marks of said excited phosphors on said document.

3. The method of sensing information on a document having a plurality of infra-red stimulable phosphor marks thereon which comprises the steps of irradiating said document with near ultra violet radiation to store energy in said phosphor marks, sensing the presence or absence of energy emitted from said document subsequent to and due to irradiation thereof thereby to detect false marks on said document, thereafter applying infra-red radiation to said document to stimulate said phosphor marks, and detecting the energy radiated by and due to stimulation of said phosphor marks.

4. In an information sensing apparatus, the combination of a record medium having information in the form of infra-red stimulable phosphor marks thereon, exciting means for storing energy in said marks, first detecting means for detecting and rejecting said record medium exhibiting radiant emissions above a predetermined energy level, stimulating means for causing said phosphor marks to emit further radiation after excitation by said exciting means and after said detecting by said first detecting means, second detecting means responsive to said further radiation from said excited phosphor marks for reading said information stored on said record medium, and means for moving said record medium from said exciting means sequentially past said first detecting means, to said stimulating means, and said second detecting means.

5. In combination, a document having information thereon in the form of a plurality of marks of an infra-red stimulable phosphor arranged in accordance with a preselected code, and document reading means comprising means for exciting said marks to store energy therein, an infra-red source for stimulating said excited marks whereby said marks emit visible radiation, detector means intermediate said exciting means and said infra-red source for detecting energy emitted from said document prior to infra-red stimulation of said marks, said detector means being operative as control means for rejecting documents emitting energy above a predetermined value, further detector means responsive to said emitted visible radiation, said infra-red source and said further detector means being simultaneously operative, and means for moving said document from said exciting means to said infra-red source.

6. In combination, a record medium having information in the form of infra-red stimulable phosphor marks thereon, exciting means for storing energy in said marks, first detector means responsive to radiant emissions above a predetermined energy level radiated from said record medium subsequent to excitation of said marks, control means coupled to said first detector station for performing a control function in response to the detection of energy above said predetermined level by said first detecting means prior to stimulation of said record medium, a stimulating means for stimulating said excited marks so that said excited marks emit further radiation in accordance with the energy stored therein by said exciting means, said stimulating means comprising means for irradiating said record medium with infra-red radiation, and a second detector means operative simultaneously with said stimulating means and responsive to said further radiant emissions radiated from said record medium, said second detector means comprising a portion of said stimulating station whereby said second detector means responds to radiant energy emitted by said record medium substantially simultaneously with the irradiation of said record medium by said infra-red radiation, and means for moving said medium in sequence past said exciting means and said first detector means, and to said stimulating and second detector means.

7. In combination, means for supplying a plurality of documents each of which has an infra-red stimulable phosphor thereon, an ultraviolet exciting means, an infra-red stimulating means, first radiation detector means between said exciting and stimulating means, said first detector means being operative to provide an output signal in response to a predetermined value of emission, second radiation detector means adjacent to and coextensive with said stimulating means, means for moving said documents in sequence from said exciting means past said first detector means to said stimulating means and second detector means, means responsive to an output signal from said first detector means for rejecting selected ones of said documents, and means responsive to an output from said second detector means for providing signals for record identifying or sorting purposes.

References Cited in the file of this patent

UNITED STATES PATENTS

| | | |
|---|---|---|
| 1,729,521 | Roddy | Sept. 24, 1929 |
| 2,000,404 | Maul | May 7, 1935 |
| 2,369,794 | Phinney et al. | Feb. 20, 1945 |
| 2,521,953 | Tuttle | Sept. 12, 1950 |
| 2,609,928 | Doust | Sept. 9, 1952 |
| 2,612,994 | Woodland et al. | Oct. 7, 1952 |
| 2,678,725 | Jacobson | May 18, 1954 |
| 2,704,634 | Rauch | Mar. 22, 1955 |
| 2,742,631 | Rajchman | Apr. 17, 1956 |
| 2,840,237 | Vander Tuin et al. | June 24, 1958 |

FOREIGN PATENTS

| | | |
|---|---|---|
| 519,361 | Belgium | May 15, 1953 |

OTHER REFERENCES

"Phosphors Verses the Periodic System of the Elements," by Leverenz, Institute of Radio Engineers, May 1, 1944.

"On Infra-Red Sensitive Phosphors," by Urback, Pearlman and Hemmendinger, Journal of the Optical Society of America, vol. 36, No. 7, July 1946.